US011442507B2

(12) United States Patent
Chang

(10) Patent No.: US 11,442,507 B2
(45) Date of Patent: Sep. 13, 2022

(54) MOBILE ELECTRONIC DEVICE

(71) Applicant: GETAC TECHNOLOGY CORPORATION, Hsinchu County (TW)

(72) Inventor: Kuang-Yeh Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 122 days.

(21) Appl. No.: 16/890,955

(22) Filed: Jun. 2, 2020

(65) Prior Publication Data
US 2021/0373607 A1 Dec. 2, 2021

(51) Int. Cl.
G06F 1/16 (2006.01)
H04M 1/18 (2006.01)
H01R 13/447 (2006.01)

(52) U.S. Cl.
CPC ......... *G06F 1/1656* (2013.01); *H01R 13/447* (2013.01); *H04M 1/185* (2013.01)

(58) Field of Classification Search
CPC ...... G06F 1/1656; G06F 1/1658; G06F 1/166; G06F 1/1684
See application file for complete search history.

(56) References Cited

U.S. PATENT DOCUMENTS

| 2012/0099266 | A1* | 4/2012 | Reber ............. G06F 1/182 361/679.26 |
| 2016/0122094 | A1* | 5/2016 | Huang ............. H04M 1/18 220/262 |
| 2017/0012659 | A1* | 1/2017 | Kim ............... G06F 1/1626 |
| 2019/0379153 | A1* | 12/2019 | Deng ............... H01R 13/5202 |
| 2021/0165473 | A1* | 6/2021 | Huang ............. G06F 1/1616 |
| 2022/0015255 | A1* | 1/2022 | Teeter ............. H05K 7/1472 |

* cited by examiner

Primary Examiner — Anthony Q Edwards

(57) ABSTRACT

A mobile electronic device includes a main framework, a back cover, a door cover, a functional module and a stop element. The back cover covers the main framework and has an expansion window. The door cover covers the expansion window. The functional module is disposed on an inner side of the door cover and electrically connected to a motherboard in the main framework. An operation interface corresponding in position to an outer side of the door cover is disposed on one side of the functional module. One side and the other side of the functional module oppose each other. The stop element is disposed on the inner side of the door cover, abuts against the other side of the functional module, and thus prevents the functional module from retracting under an external force. Therefore, the mobile electronic device is insusceptible to a collision and a fall.

8 Claims, 9 Drawing Sheets

MOBILE ELECTRONIC DEVICE

BACKGROUND OF THE INVENTION

Field of the Invention

The present disclosure relates to mobile electronic devices and, more particularly, to a mobile electronic device which optionally comprises an expansion unit insusceptible to a collision and a fall.

Description of the Prior Art

Owing to its limited available space, a conventional mobile electronic device optionally equipped with an expansion unit which is intended to expand some functions but often ends up falling or being hit.

As a result, once the fall or collision happens to the expansion unit, a functional module therein, such as a barcode reader, will retract under an external force generated because of the fall or collision and thus malfunction or get damaged. In view of this, the prior art still has room for improvement.

SUMMARY OF THE INVENTION

It is an objective of the present disclosure to provide a mobile electronic device which optionally comprises an expansion unit in a limited space, and the expansion unit further comprises a stop element which renders the expansion unit insusceptible to a collision and a fall.

In order to achieve the above and other objectives, the present disclosure provides a mobile electronic device, comprising: a main framework having a motherboard; a back cover covering the main framework and having an expansion window; a door cover covering the expansion window; a functional module disposed on an inner side of the door cover, electrically connected to the motherboard, and having a side which an operation interface is disposed on, the operation interface corresponding in position to an outer side of the door cover; and a stop element disposed on the inner side of the door cover and abutting against another side of the functional module, the another side facing away from the operation interface.

Compared with the prior art, the mobile electronic device of the present disclosure has an advantage as follows: the stop element stops the functional module from retracting under an external force to thereby render the mobile electronic device insusceptible to a collision and a fall.

DETAILED DESCRIPTION OF THE EMBODIMENTS

Figure 1:
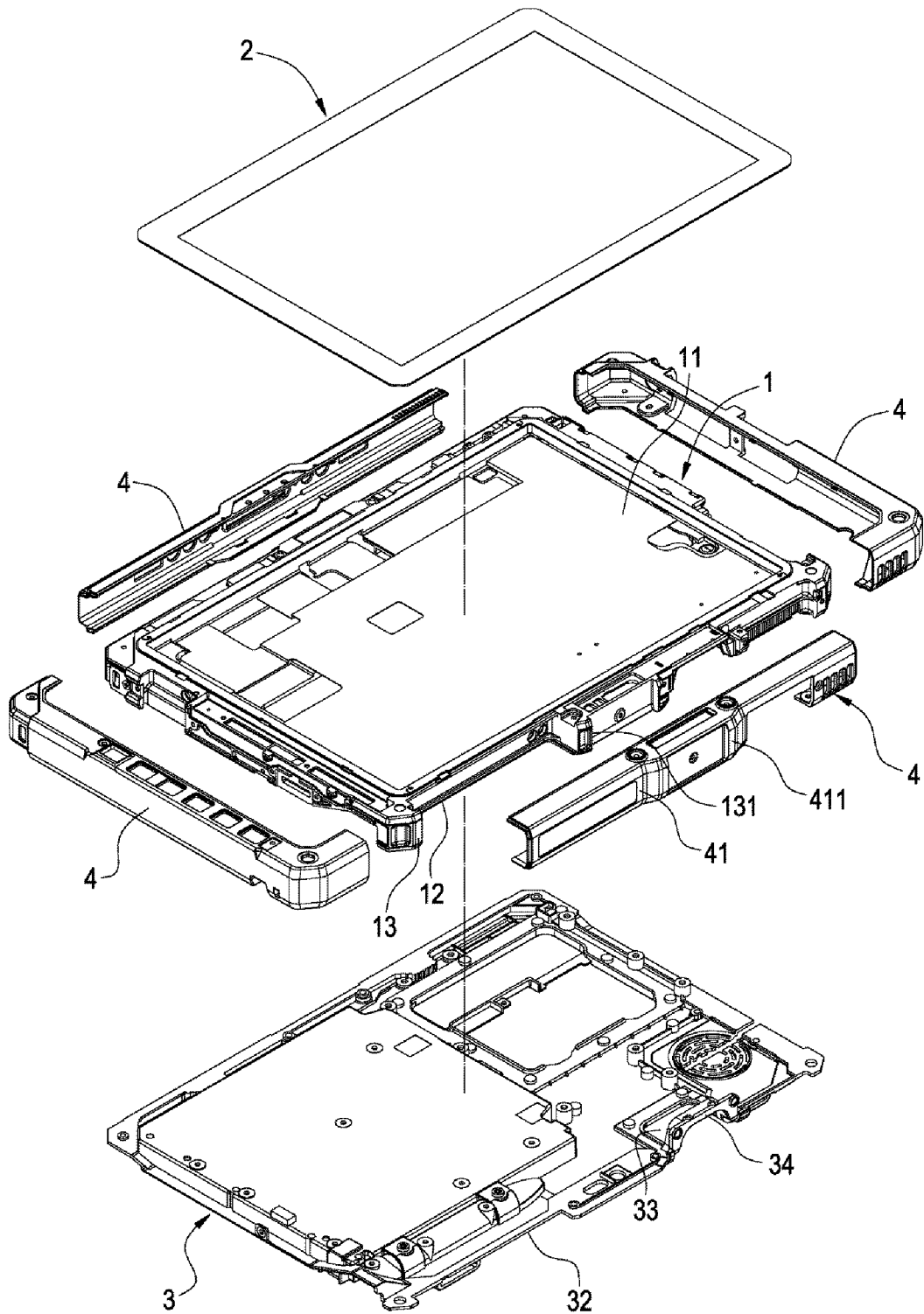
FIG. 1 is an exploded view of a mobile electronic device according to the present disclosure (without showing an expansion unit).

Objectives, features, and advantages of the present disclosure are hereunder illustrated with specific embodiments, depicted with drawings, and described below. However, the accompanying drawings are illustrative, rather than restrictive, of the present disclosure.

Referring to FIG. 1, FIG. 2, FIG. 7 and FIG. 8, the present disclosure provides a mobile electronic device comprising a main framework 1, a back cover 3, a door cover 5, a functional module 6 and a stop element 7. The mobile electronic device further comprises a touch panel 2 as needed. The door cover 5, the functional module 6 and the stop element 7 together form an expansion unit S. Thanks to the expansion unit S, the mobile electronic device is capable of selectively expanding use of required functional apparatuses, such as a barcode reader, a fingerprint detector, a camcorder lens, and an infrared communication apparatus.

The main framework 1 has two opposing framework surfaces 11, 12 and a plurality of sides 13 connected between the two framework surfaces 11, 12. The main framework 1 has therein a motherboard (not shown). The touch panel 2 is disposed on and fixed to the framework surface 11. In a variant embodiment not illustrated by any diagram, a display screen or any other electronic device is fixed to the framework surface 11. Therefore, the framework surfaces 11, 12 are illustrative, rather than restrictive, of the present disclosure.

Figure 7:
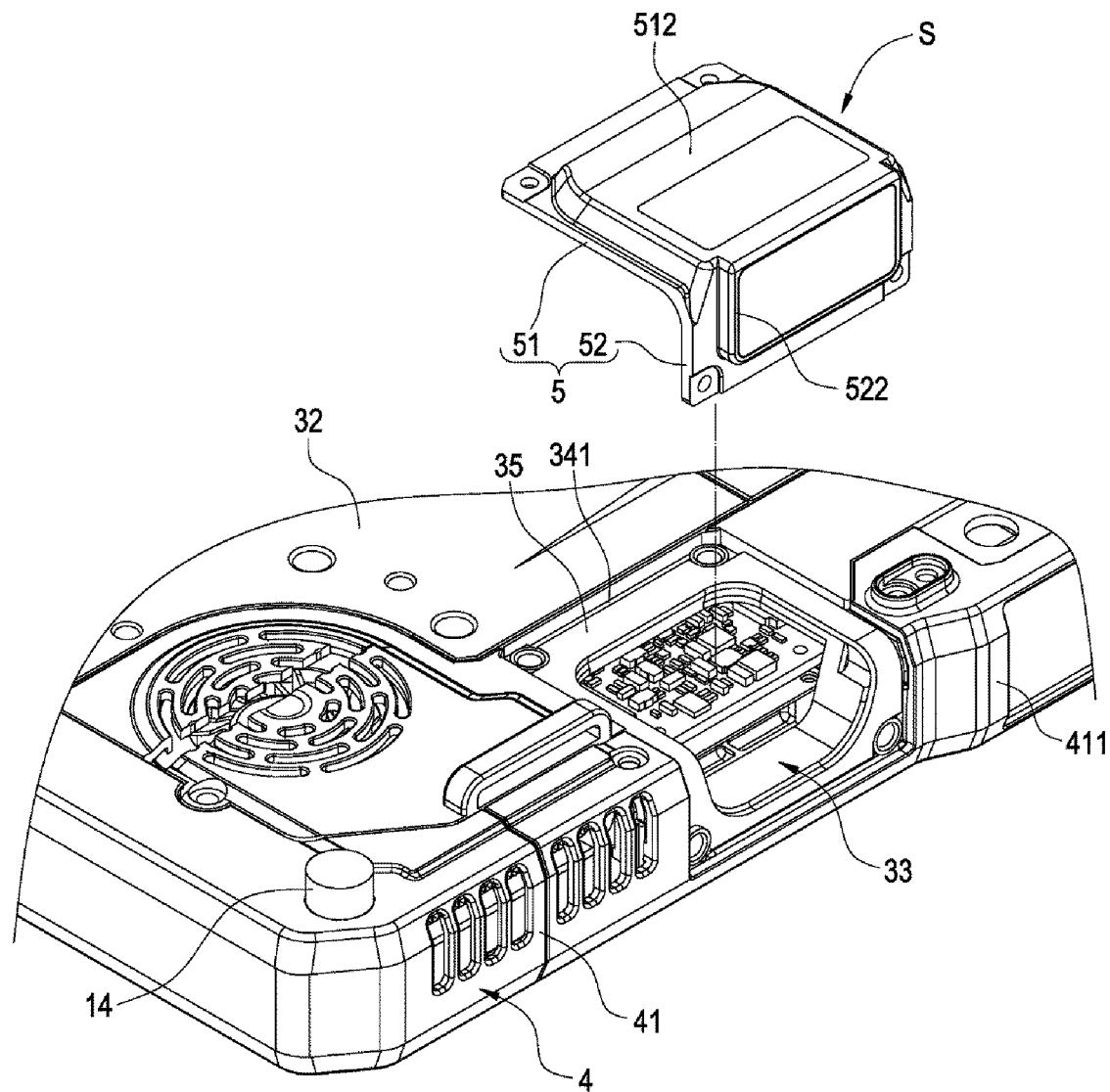
FIG. 7 is a perspective view of the mobile electronic device before the expansion unit is fitted to according to the present disclosure.

The back cover 3 is disposed on and fixed to the framework surface 12, such that the back cover 3 covers the main framework 1. The back cover 3 has an expansion window 33 and has an exposed outer cover surface 32. The expansion window 33 is in communication with the main framework 1 and thus with the motherboard. The expansion window 33 can be located at any point of the back cover 3 and preferably corresponds in position to the framework surface 12 and one of the sides 13 of the main framework 1 (as shown in FIG. 1 and FIG. 7). Therefore, the expansion unit S makes use of the space inside the framework surface 12 and the space inside one of the sides 13 simultaneously and thereby makes good use of space.

The door cover 5 corresponds in position to the expansion window 33 and is fixed to the outer cover surface 32 of the back cover 3; consequently, the door cover 5 covers and closes the expansion window 33. The door cover 5 has an inner side (not denoted by any reference numeral) and an outer side (not denoted by any reference numeral) opposing the inner side.

Figure 6:
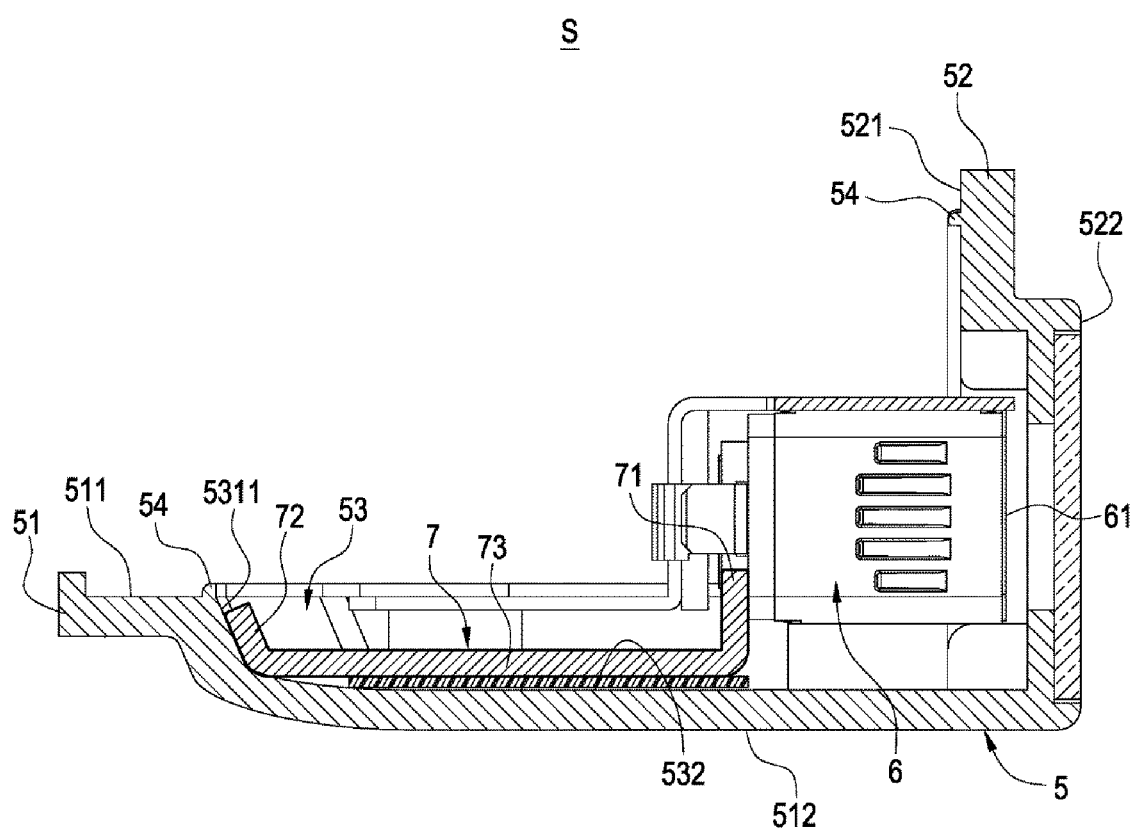
FIG. 6 is a cross-sectional view of the expansion unit according to the present disclosure.

The functional module 6 is disposed on the inner side of the door cover 5. The functional module 6 is electrically connected to a motherboard via the expansion window 33. The electrical connection between the functional module 6 and the motherboard is achieved by, for example, a plurality of flexible printed circuits (FPC, not shown) or a plurality of flexible flat cables (FFC, not shown), but the present disclosure is not limited thereto. Referring to FIG. 6, an operation interface 61 is disposed on an outward side of the functional module 6 and corresponds in position to the outer side of the door cover 5 (actually corresponds in position to a lateral plate outer side 522 shown in FIG. 6 and described later).

After the door cover 5 has been fixed to the back cover 3, the outer side of the door cover 5 is directly exposed from the entire mobile electronic device; consequently, the functional module 6 is likely to retract toward the interior of the mobile electronic device under an external force (generated, for example, as a result of a collision or a fall which happens to the mobile electronic device in its entirety).

To stop the external force, the stop element 7 is disposed on the inner side of the door cover 5 and abuts against an inward side (opposite the aforesaid outward side) of the functional module 6. The door cover 5, the functional module 6 and the stop element 7 together form the expansion unit S.

Figure 4:
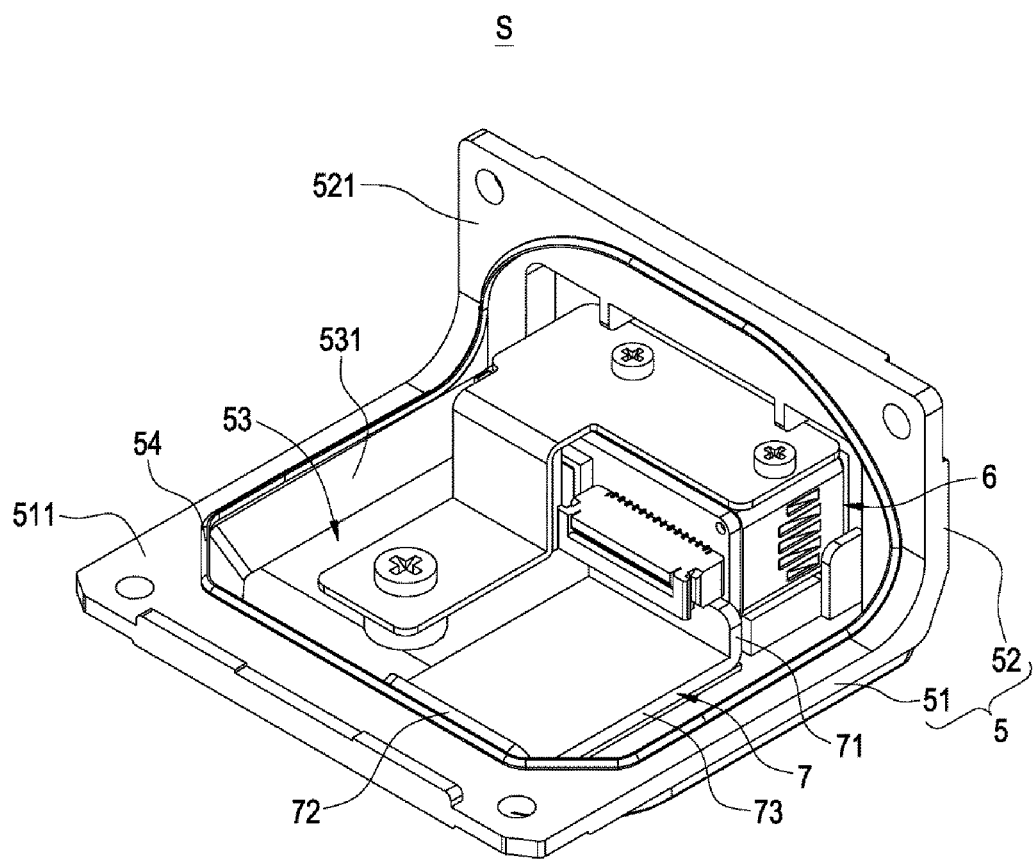
FIG. 4 is a perspective view based on FIG. 3 according to the present disclosure.
Figure 5:
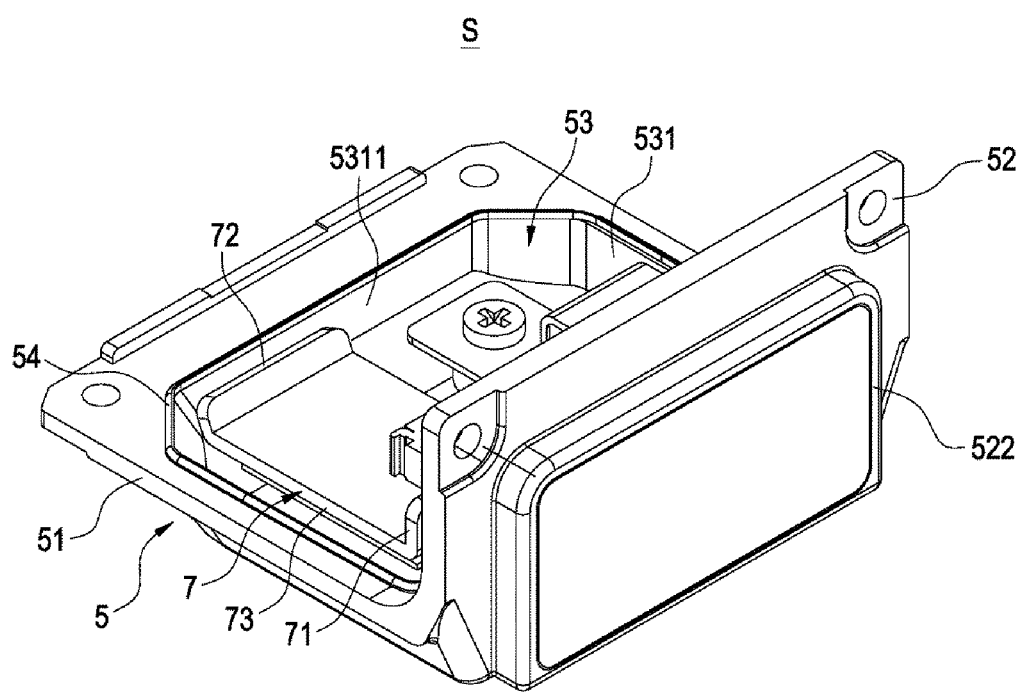
FIG. 5 is a perspective view based on FIG. 3 from another angle according to the present disclosure.

Referring to FIG. 4, even if the expansion unit S is subjected to an external force, the stop element 7 will counter the external force and thus stop the retraction of the functional module 6 relative to the door cover 5, thereby preventing the functional module 6 from malfunctioning or getting damaged.

Figure 2:
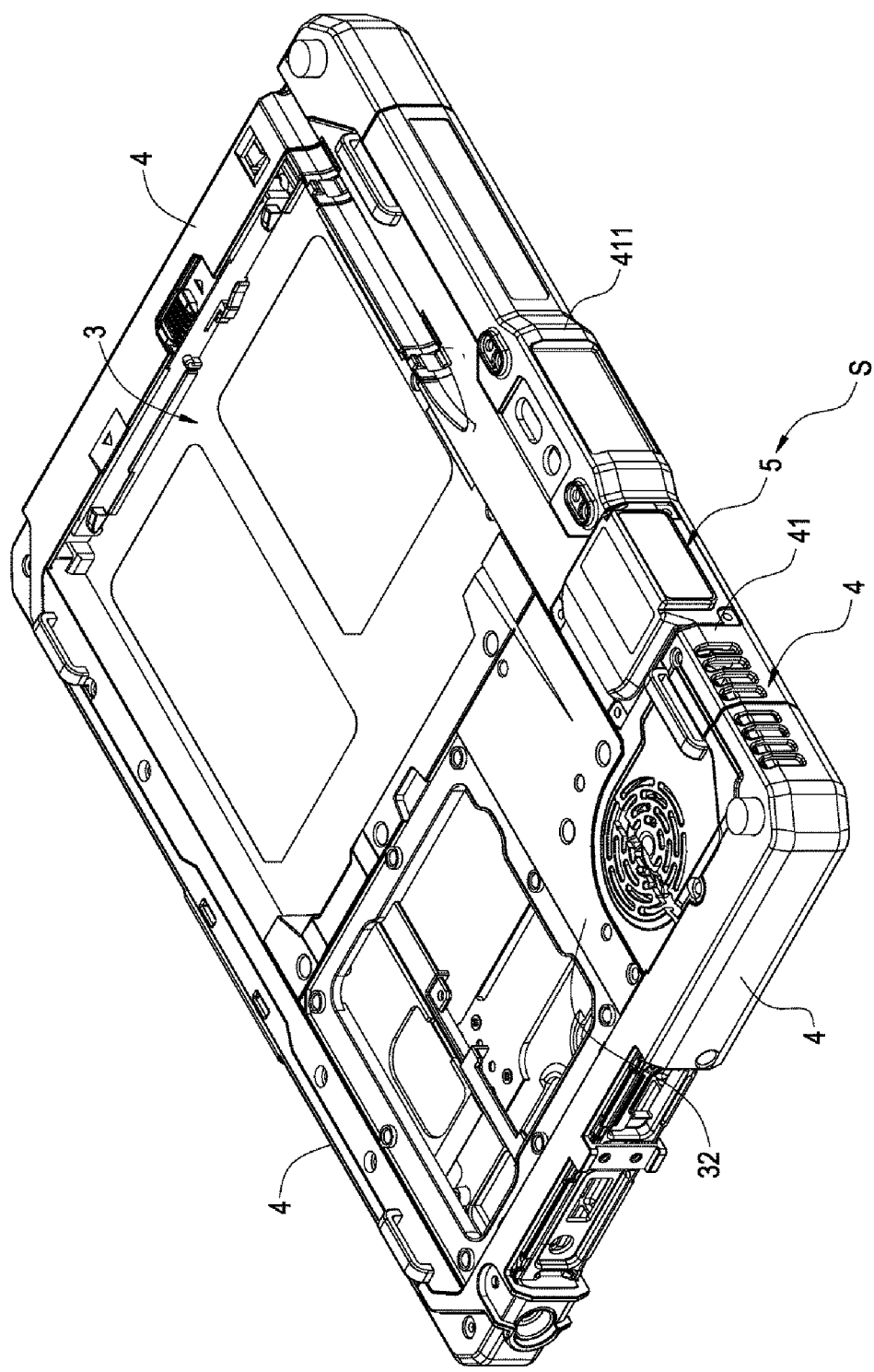
FIG. 2 is a perspective view of the mobile electronic device from another angle according to the present disclosure.
Figure 3:
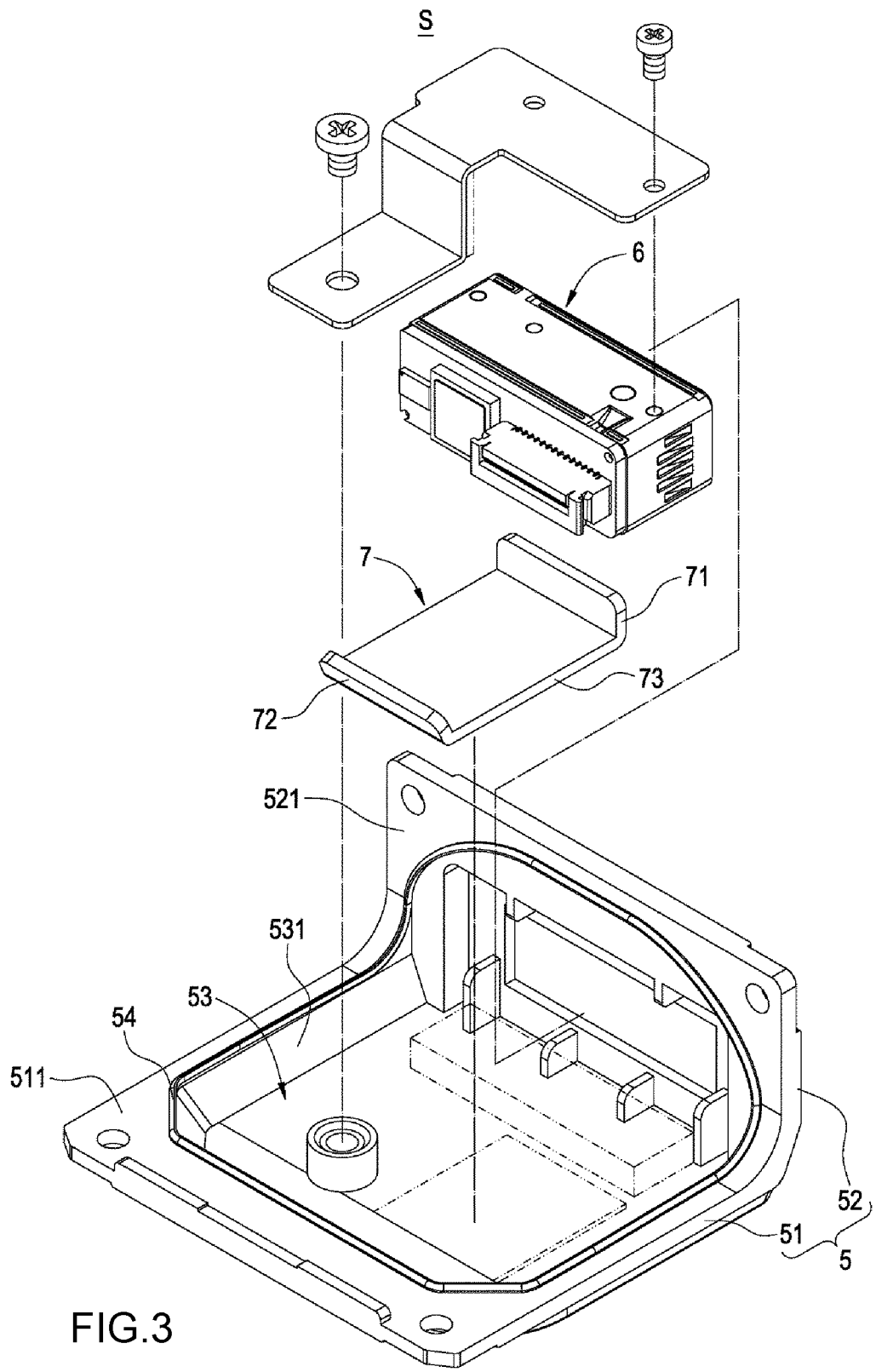
FIG. 3 is an exploded view of an expansion unit according to the present disclosure.

The present disclosure is not restrictive of the structure of the door cover 5. In this embodiment, the door cover 5 is illustrated by FIG. 3 through FIG. 6. The door cover 5 essentially comprises a back plate 51 and preferably further comprises a lateral plate 52 bent and connected to the back plate 51, such that the door cover 5 corresponds in shape to the framework surface 12 and one of the sides 13 (as shown in FIG. 1, FIG. 2 and FIG. 7). The aforesaid inner side of the door cover 5 includes a back plate inner side 511 of the back plate 51 and a lateral plate inner side 521 of the lateral plate 52, whereas the aforesaid outer side of the door cover 5 includes a back plate outer side 512 of the back plate 51 and a lateral plate outer side 522 of the lateral plate 52.

Figure 8:
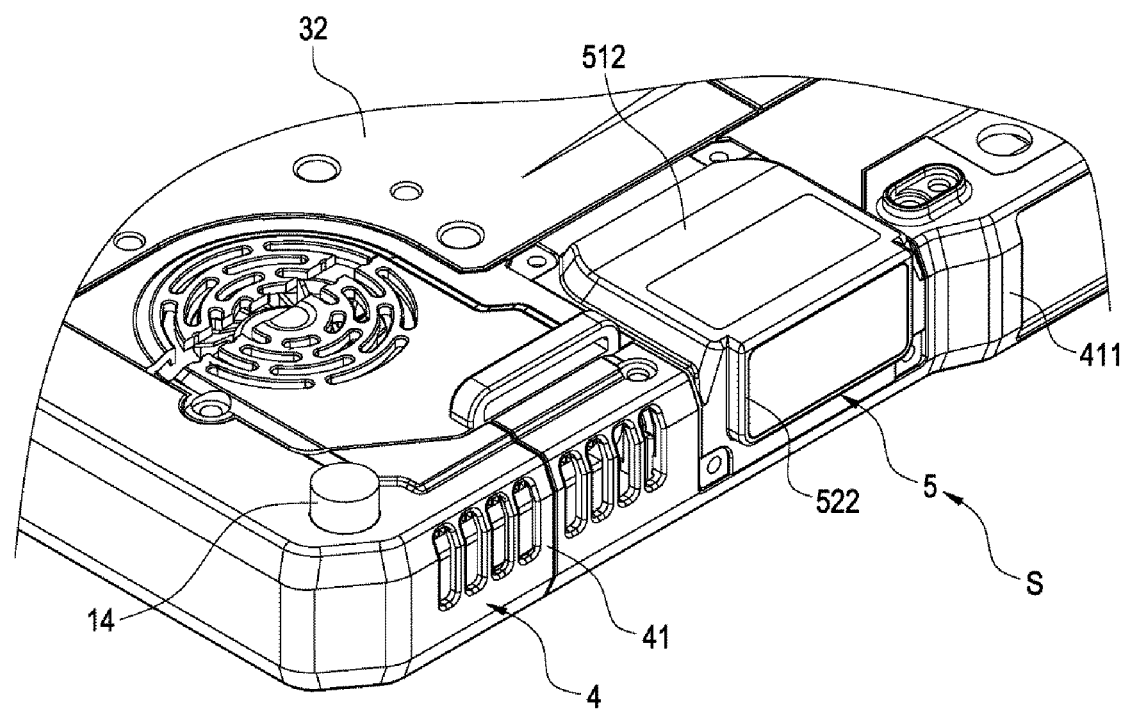
FIG. 8 is a perspective view of the mobile electronic device after the expansion unit has been fitted to according to the present disclosure.
Figure 9:
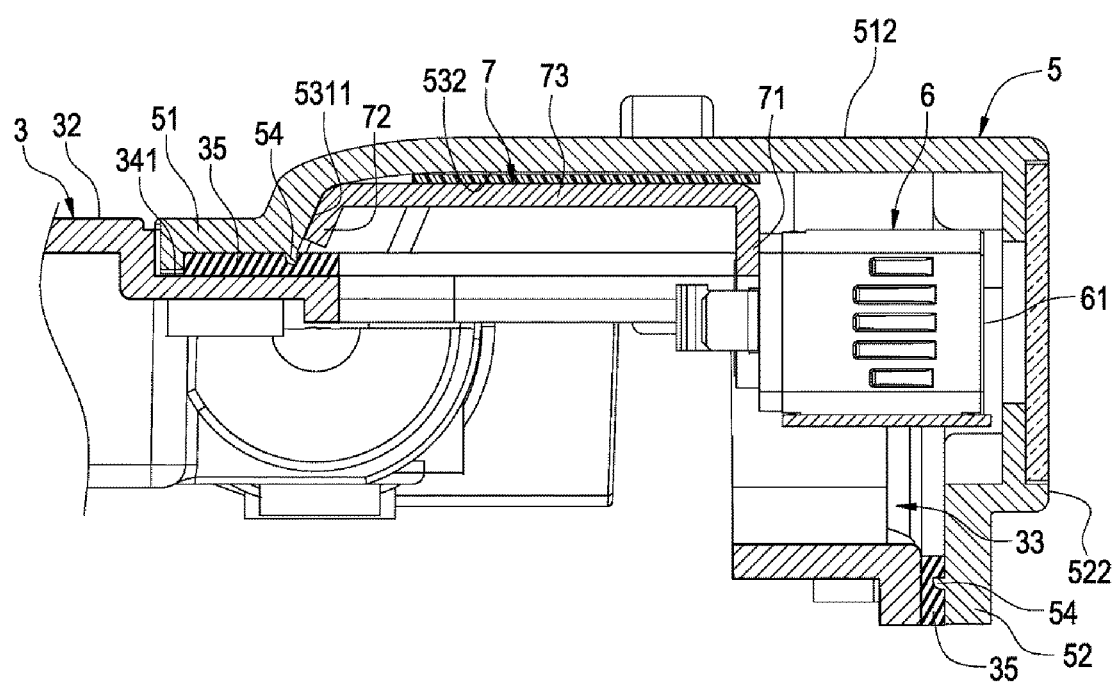
FIG. 9 is a partial cross-sectional view based on FIG. 8 according to the present disclosure.

Referring to FIG. 7 and FIG. 8, to augment the insusceptibility of the expansion unit S (and especially the functional module 6) to a collision and a fall, a plurality of protruding members 14 are protrudingly disposed at the periphery of the framework surface 12 of the main framework 1. For instance, a protruding member 14 is protrudingly disposed at each of the four corners of the framework surface 12, and all the protruding members 14 are higher than the back plate outer side 512. Thus, even if the external force is exerted toward the back plate outer side 512, the impact of the external force will be on the protruding members 14 rather than the back plate outer side 512, thereby enhancing the insusceptibility of the back plate outer side 512 to a collision and a fall. In a variant embodiment, the protruding members 14 are disposed on the outer cover surface 32 (not shown) of the back cover 3.

Referring to FIG. 1, FIG. 2, FIG. 7 and FIG. 8, at least one protruding portion 131 is protrudingly disposed on one of the sides 13 of the main framework 1, and the protruding portion 131 is higher than the lateral plate outer side 522. Thus, even if the external force is exerted toward the lateral plate outer side 522, the impact of the external force will be on the protruding portion 131 rather than the lateral plate outer side 522, thereby enhancing the insusceptibility of the lateral plate outer side 522 to a collision and a fall. Referring to FIG. 1, in a variant embodiment, a protruding portion 411 is disposed on a side 41 of a fitting element 4 to enhance the insusceptibility to a collision and a fall. In other words, after the main framework 1, the touch panel 2 and the back cover 3 have been stacked up, one said fitting element 4 is fitted to each of the sides 13, and the protruding portion 411 is protrudingly disposed on the side 41 of one of the fitting elements 4. The aforesaid two types of arrangement can be separately implemented. In this embodiment, the aforesaid two types of arrangement are concurrently implemented as follows: the fitting element 4 with the protruding portion 411 is fitted to one of the sides 13 with the protruding portion 131.

Referring to FIG. 3 through FIG. 6, to augment the stopping strength and stopping stability of the stop element 7, a stopping member 5311 is disposed on the inner side of the door cover 5, such that two opposing ends of the stop element 7 abut against the stopping member 5311 and the inward side of the functional module 6, respectively.

The present disclosure is not restrictive of the structure of the stopping member 5311. In this embodiment, a recess 53 is disposed on the inner side of the door cover 5, such that a recess wall 531 is disposed at the periphery of the inner side of the door cover 5 and corresponds in position to the recess 53, and a portion of the recess wall 531 (facing the inward side) functions as the stopping member 5311, thereby optimizing the stopping strength and stopping stability.

To enable the stop element 7 to perform its stopping function within the recess 53, the stop element 7 comprises a first abutting portion 71, a second abutting portion 72, and a connecting portion 73 connected between the first abutting portion 71 and the second abutting portion 72. The first abutting portion 71 and the second abutting portion 72 bend relative to two opposing ends of the connecting portion 73, respectively. The first abutting portion 71 is in contact with the aforesaid inward sides, because both its shape and bend angle match the aforesaid inward sides. The second abutting portion 72 is in contact with the stopping member 5311, because both its shape and bend angle match the stopping member 5311. A surface of the connecting portion 73 is in direct or indirect contact with a recess bottom surface 532 of the recess 53 and thereby generates an enhanced supportive force.

The recess 53 is collectively disposed on the back plate inner side 511 and lateral plate inner side 521. The back plate outer side 512 and lateral plate outer side 522 bulge relatively. Consequently, owing to the recess 53, both the functional module 6 and the stop element 7 gain extra available space to alleviate the inadequacy of space available to the mobile electronic device.

Referring to FIG. 4 through FIG. 9, to prevent water from seeping into the functional module 6, it is necessary to provide a waterproofing structure (not denoted by any reference numeral) between the door cover 5 and the back cover 3. The waterproofing structure comprises: a rib 54 disposed on the inner side of the door cover 5; and a resilient portion 35 disposed on an outer connecting surface 341 of the back cover 3. The resilient portion 35 can not only be directly disposed on the outer connecting surface 341 but also be equipped with a resilient pad or a waterproof foam as shown in the diagrams, but the present disclosure is not limited thereto. The outer connecting surface 341 surrounds the expansion window 33. When the door cover 5 covers the expansion window 33, the resilient portion 35 is pressed by the rib 54 and thus resiliently sags to become watertight, thereby effecting waterproofness.

The present disclosure is not restrictive of the position of the waterproofing structure. In this embodiment, the rib 54 is protrudingly disposed on the back plate inner side 511 and lateral plate inner side 521 and surrounds the recess 53. The back cover 3 has a surrounding portion 34 (shown in FIG. 1) which surrounds the expansion window 33 and corresponds in position to the rib 54. The outer connecting surface 341 is defined on the outer side (exposed side) of the surrounding portion 34. The surrounding portion 34 bends relative to the framework surface 12 and one of the sides 13, such that the surrounding portion 34 corresponds in shape to the framework surface 12 and one of the sides 13 (shown in FIG. 1, FIG. 2 and FIG. 7).

The door cover 5 corresponds in position to the expansion window 33 and is fixed to the back cover 3, such that the outer connecting surface 341 of the surrounding portion 34 is connected to the inner sides (inclusive of 511 and 521) of the door cover 5; consequently, the resilient portion 35 is pressed by the rib 54 and thus resiliently sags to become watertight, thereby effecting waterproofness.

In a variant embodiment not illustrated by any diagram, the rib 54 is disposed on the outer connecting surface 341, and the resilient portion 35 is disposed on the door cover 5, thereby effecting waterproofness.

In conclusion, the mobile electronic device of the present disclosure achieves the aforesaid objective of the present disclosure and overcomes the aforesaid drawbacks of the prior art.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent structural changes made to the aforesaid embodiments shall fall within the scope of the present disclosure. Accordingly, the legal protection for the present disclosure shall be defined by the appended claims.

What is claimed is:

1. A mobile electronic device, comprising:
   a main framework having a motherboard;
   a back cover covering the main framework and having an expansion window;
   a door cover covering the expansion window;
   a functional module disposed on an inner side of the door cover, electrically connected to the motherboard, and having a first side which an operation interface is disposed on, the operation interface corresponding in position to an outer side of the door cover;
   a stop element disposed on the inner side of the door cover and having a first end abutting against a second side of the functional module, the second side facing away from the operation interface; and
   a stopping member disposed on the inner side of the door cover, wherein the stop element has a second end abutting against the stopping member.

2. The mobile electronic device of claim 1, wherein the door cover comprises a back plate, and the outer side of the door cover includes a back plate outer side of the back plate, with a plurality of protruding members protrudingly disposed at a periphery of the main framework or the back cover and being higher than the back plate outer side.

3. The mobile electronic device of claim 1, wherein the door cover comprises a lateral plate, and the outer side of the door cover includes a lateral plate outer side of the lateral plate, with a protruding portion disposed on a side of the main framework and protruding from the lateral plate outer side.

4. The mobile electronic device of claim 1, further comprising a touch panel, wherein the main framework has two opposing framework surfaces, one of which is covered with the back cover, and the touch panel is disposed on the other framework surface.

5. The mobile electronic device of claim 1, wherein a recess is disposed on the inner side of the door cover, and a recess wall is disposed at a periphery of the inner side of the door cover and corresponds in position to the recess, wherein a portion of the recess wall functions as the stopping member.

6. A mobile electronic device, comprising:
   a main framework having a motherboard;
   a back cover covering the main framework and having an expansion window;
   a door cover covering the expansion window;
   a functional module disposed on an inner side of the door cover, electrically connected to the motherboard, and having a first side which an operation interface is disposed on, the operation interface corresponding in position to an outer side of the door cover; and
   a stop element disposed on the inner side of the door cover and abutting against a second side of the functional module, the second side facing away from the operation interface;
   wherein a rib and a resilient portion are disposed on the inner side of the door cover and an outer connecting surface of the back cover, respectively, the outer connecting surface surrounding the expansion window, thereby allowing the resilient portion to be pressed by the rib and thus resiliently sag when the door cover covers the expansion window; and
   wherein the door cover comprises a back plate and a lateral plate bent and connected to the back plate, and the inner side of the door cover includes a back plate inner side of the back plate and a lateral plate inner side of the lateral plate, wherein the rib is protrudingly disposed on the back plate inner side and the lateral plate inner side, or the resilient portion is disposed on the back plate inner side and the lateral plate inner side.

7. The mobile electronic device of claim 6, wherein the resilient portion is a resilient pad or a waterproof foam.

8. The mobile electronic device of claim 6, wherein the back cover has a surrounding portion surrounding the expansion window, and the outer connecting surface is defined on an outer side of the surrounding portion and thereby connected to the inner side of the door cover, wherein the resilient portion is disposed on the outer connecting surface, or the rib protrudes from the outer connecting surface.

\* \* \* \* \*